United States Patent
Thackston et al.

(10) Patent No.: US 8,842,961 B2
(45) Date of Patent: Sep. 23, 2014

(54) UNIVERSAL FAN-OUT DEVICE

(75) Inventors: Kevin Michael Thackston, York, PA (US); Robert Neil Mulfinger, York Haven, PA (US); Richard Paul Walter, Elizabethtown, PA (US); David James Fabian, Mount Joy, PA (US); James Leo Barry, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 172 days.

(21) Appl. No.: 13/493,295

(22) Filed: Jun. 11, 2012

(65) Prior Publication Data
US 2013/0330052 A1 Dec. 12, 2013

(51) Int. Cl.
*G02B 6/00* (2006.01)

(52) U.S. Cl.
USPC ......................................... 385/137

(58) Field of Classification Search
None
See application file for complete search history.

(56) References Cited

U.S. PATENT DOCUMENTS

| | | | |
|---|---|---|---|
| 6,185,348 B1 * | 2/2001 | Shahid | 385/49 |
| 6,295,400 B1 * | 9/2001 | Shahid | 385/114 |
| 6,614,971 B2 * | 9/2003 | Sun et al. | 385/114 |
| 6,742,937 B2 * | 6/2004 | Lee et al. | 385/78 |
| 7,054,536 B2 * | 5/2006 | Sun | 385/137 |
| 7,352,921 B2 * | 4/2008 | Saito et al. | 385/14 |
| 8,457,461 B2 * | 6/2013 | Ott | 385/103 |
| 2005/0254755 A1 * | 11/2005 | Sun | 385/54 |

* cited by examiner

*Primary Examiner* — Sung Pak

(57) ABSTRACT

A universal fan-out device comprising a housing having first and second openings, the housing comprising first and second housing components, each of the first and second housing components having a first end and a second end, a channel running between the first and second ends, and sides along each side of the channel, a resilient material disposed in the channel to restrict movement of fibers within the channel, and an engagement mechanism operatively connected to the housing to inter-engage the first and second housing components together.

18 Claims, 5 Drawing Sheets

UNIVERSAL FAN-OUT DEVICE

FIELD OF INVENTION

The invention relates generally to a device for housing and controlling the bending of optical fibers split from a bundle of fibers.

BACKGROUND OF INVENTION

In fiber optic communications networks, optical fibers are used to transmit signals throughout the network. Because optical fibers are thin, multiple optical fibers are often routed together in groups of fibers that are connected or bundled together. One arrangement of multiple optical fibers is a ribbon fiber, which is a group of optical fibers aligned in a single plane and held together by a film.

As is known in the art, at a certain point along the ribbon cable, access to individual fibers is required for connectorization or splicing of the discrete fibers. Access to individual fibers requires separating them from the ribbon cable at a point referred to as the "break-out point." Although the discrete fibers are typically enclosed in a buffer tube to protect them and minimize their bending, at the break-out point, the individual fibers are neither contained in their buffer tube nor secured in the ribbon cable. Consequently, the fibers tend to be particularly fragile at this point, and thus must be protected by holding them in a certain position relative to the ribbon cable to avoid excessive bending. To this end, customized "break-out" or "fan-out" devices have been developed.

Fan-out devices typically are trapezoidal in shape with the ribbon cable entering the short side of the trapezoid and discrete fibers leaving the longer side of the trapezoid. The device has a series of internal channels to guide and control the discrete fibers as the break out from the ribbon cable.

Although traditional fan-out devices are effective in protecting fibers from excessive bending, Applicants recognize that such devices are typically customized for a particular application, and are specific to the size of the ribbon cable and the number of discrete fibers that are broken out from the ribbon cable. Such specificity may be limiting. For example, there may be applications in which just a few fibers need to be fanned out from the ribbon and the rest of the ribbon cable can otherwise be left intact. In such applications, the fan-out device must be customized with a specific number of channels to accommodate the few fibers that need to be fanned out.

Applicants realize that such customized fan-out devices are inconvenient and expensive to fabricate in small quantities and inventory. Therefore, Applicants have determined that a universal fan-out device is needed which can accommodate a range of ribbon cable sizes and fan-out configurations. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a fan-out device which is not limited in its applicability by dedicated internal channels. Rather, the device of the present invention uses resilient members to hold the fibers in place, thus eliminating dedicated internal channels. Accordingly, the device can accommodate a range of ribbon cable sizes and fan out configurations.

In one embodiment, the universal fan out device comprises: (a) a housing having first and second openings, the housing comprising first and second housing components, each of the first and second housing components having a first end and a second end, a channel running between the first and second ends, and sides along each side of the channel; (b) a resilient material disposed in the channel to restrict movement of fibers within the channel; and (c) an engagement mechanism operatively connected to the housing to inter-engage the first and second housing components together.

BRIEF DESCRIPTION OF DRAWINGS

FIG. 2 shows a housing component of the embodiment shown in FIG. 1a.

FIG. 4 shows a cross-sectional view of the fan-out device of FIG. 1a.

DETAILED DESCRIPTION

Figure 1A:
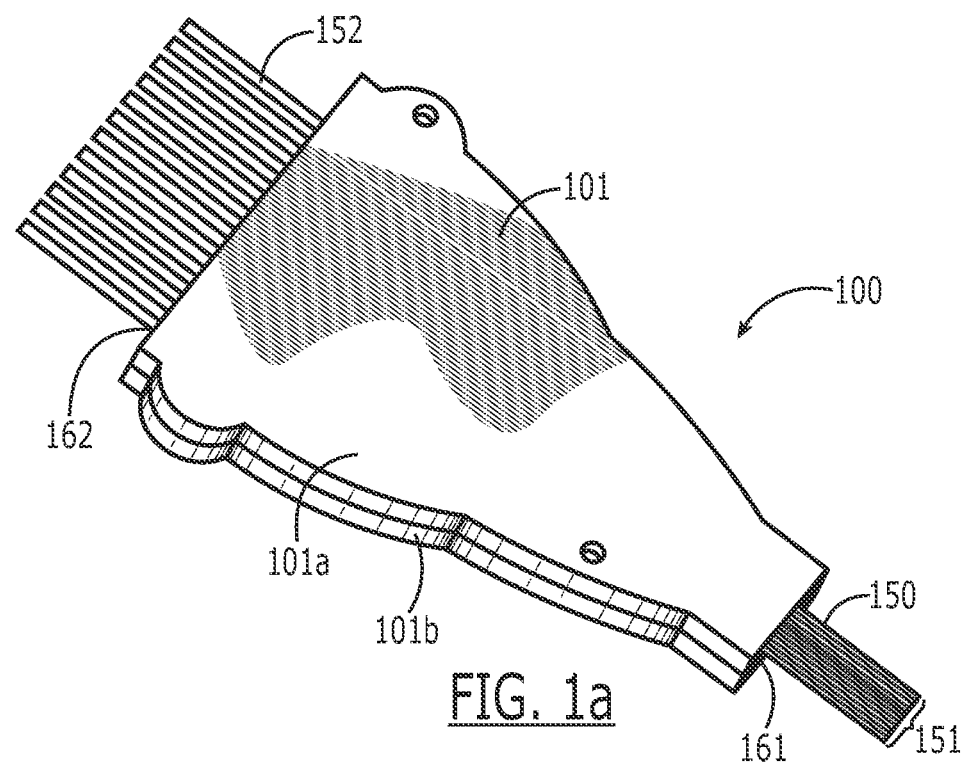
FIG. 1a shows a top perspective view of a complete assembly of one embodiment of the fan-out device of the present invention.
Figure 1B:
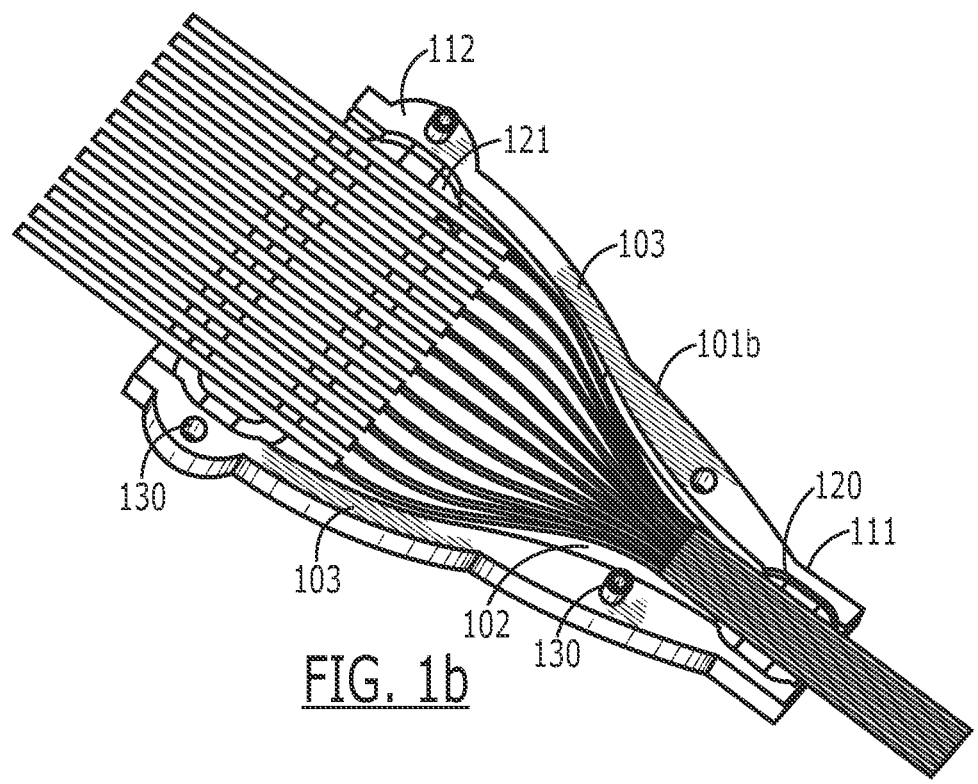
FIG. 1b shows the embodiment of FIG. 1a with the top housing component removed.
Figure 2:
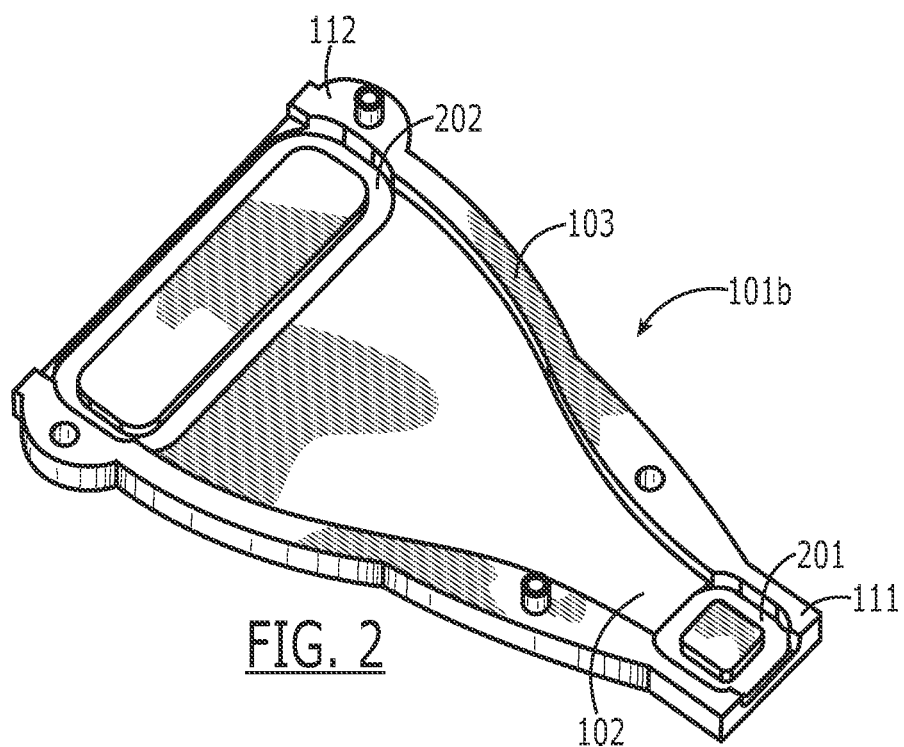

Referring to FIGS. 1a, 1b and 2, a universal fan-out device 100 is shown. The fan-out device 100 comprises a housing 101 having first and second openings 161, 162, and comprising first and second housing components 101a, 101b. Each of the first and second housing components have a first end 111 and a second end 112, a channel 102 running between the first and second ends, and sides 103 along each side of the channel 102. The device 100 also comprises a resilient material 120, 121 disposed at least at the first and second ends 111, 112 in the channel 102 to restrict movement of fibers within the channel. The device also comprises an engagement mechanism 130 operatively connected to the housing to inter-engage the first and second housing components together. In one embodiment, the engagement mechanism 130 is defined on at least one of the sides 103 of the first and second housing components 101a, 101b and is configured to inter-engage with a corresponding engagement mechanism on the other housing component when the first and second housing components 101a, 101b are mated. Each of the features is discussed in greater detail below.

Referring to FIG. 1a, a complete fan-out device 100 is shown in which fibers 150 enter the first opening 161 in the form of a ribbon cable 151 and exit the device 100 at the second opening 162 as discrete fibers in buffer tubes 152. In one embodiment, the second opening 162 being larger than the first opening 161 to accommodate the "fanned-out" fiber. It should be understood, however, that different configurations are possible. For example, only a portion of the fibers may be split off into discrete fibers and the remaining portion of the ribbon cable may exit the second opening 162.

Figure 8:
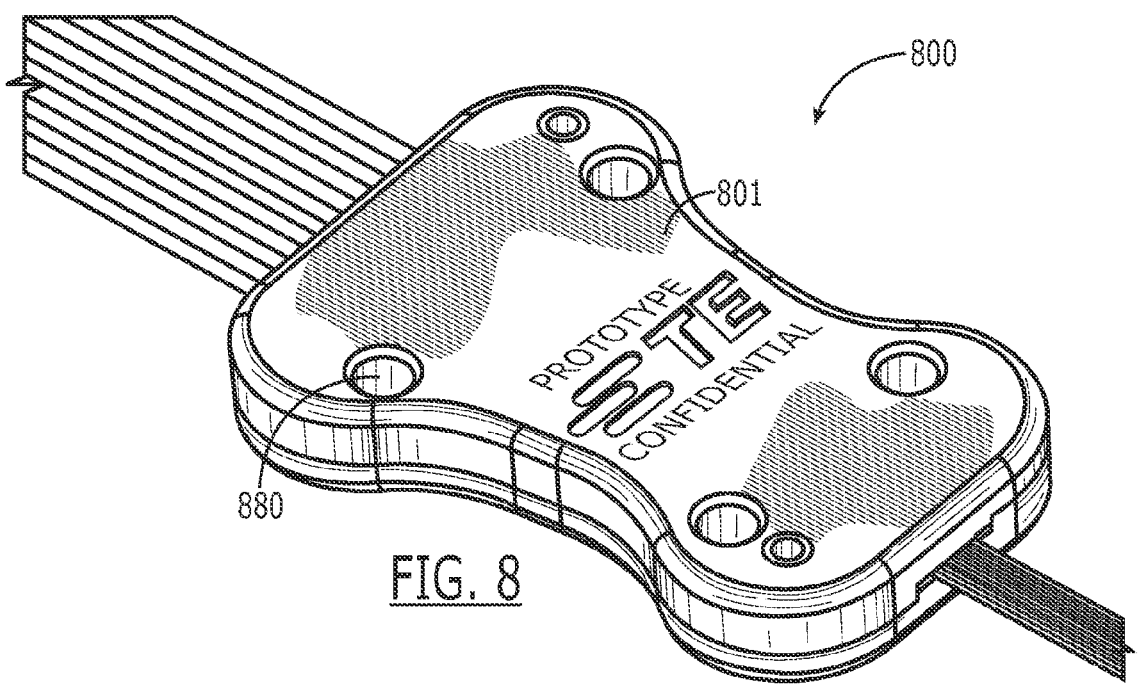
FIG. 8 shows a complete assembly of the fan-out device of FIG. 6.

As mentioned above, in one embodiment, the device 100 functions to hold the discrete fibers 150 relative to the ribbon cable 151 to avoid excessive bending among the fibers and delamination of the ribbon cable. This function is accomplished through a combination of a rigid housing 101 and resilient material 120, 121 in the housing which grip and hold the fibers. The housing 101 may also function to secure the fan-out device to a particular location in a cabinet or other structure. To this end, the housing may comprise screw of bolt holes 880 to facilitate mounting as shown in the fan-out device 800 depicted in FIG. 8.

The housing component 101*b* comprises a channel 102 from the first end 111 to the second 112. On either side of the channel 102 are sides 103. The housing should comprise a relatively rigid material such as a non-elastic, polymeric material, for example, polyetherimide (e.g., Ultem®), Polyether ether ketone (PEEK), liquid crystalline polymers, and mixtures thereof, or a metal, for example, aluminum. In one embodiment, the housing 101 comprises a moldable material such as Ultem®. Additionally, to add rigidity to housing, especially at the second end 112, where the clamping force of the housing components 101*a*, 101*b* around the discrete fibers 152 may deform the housing components causing them to bow, a support/engagement mechanism may be added in the channel 102 at the second end 112.

Referring to FIGS. 1*b* and 2, one embodiment of a housing component 101*b* of the housing 101 is shown, with and without fibers, respectively. As shown, the housing component 101*b* is roughly trapezoidal in shape, with the first end 111 at the short side of the trapezoid and the second end 112 at the longer side of the trapezoid. Although the housing component is depicted as a trapezoid in this embodiment, it should be understood that it may be any shape providing it comprises a first end to receive a ribbon cable or similarly bundled fibers, and a second end in which at least a portion of the fibers of the bundle exit the housing 101 as discrete fibers or subgroups of the bundled fibers. For example, the device 800 shown in FIG. 8 has an hour-glass configuration.

Figure 3:
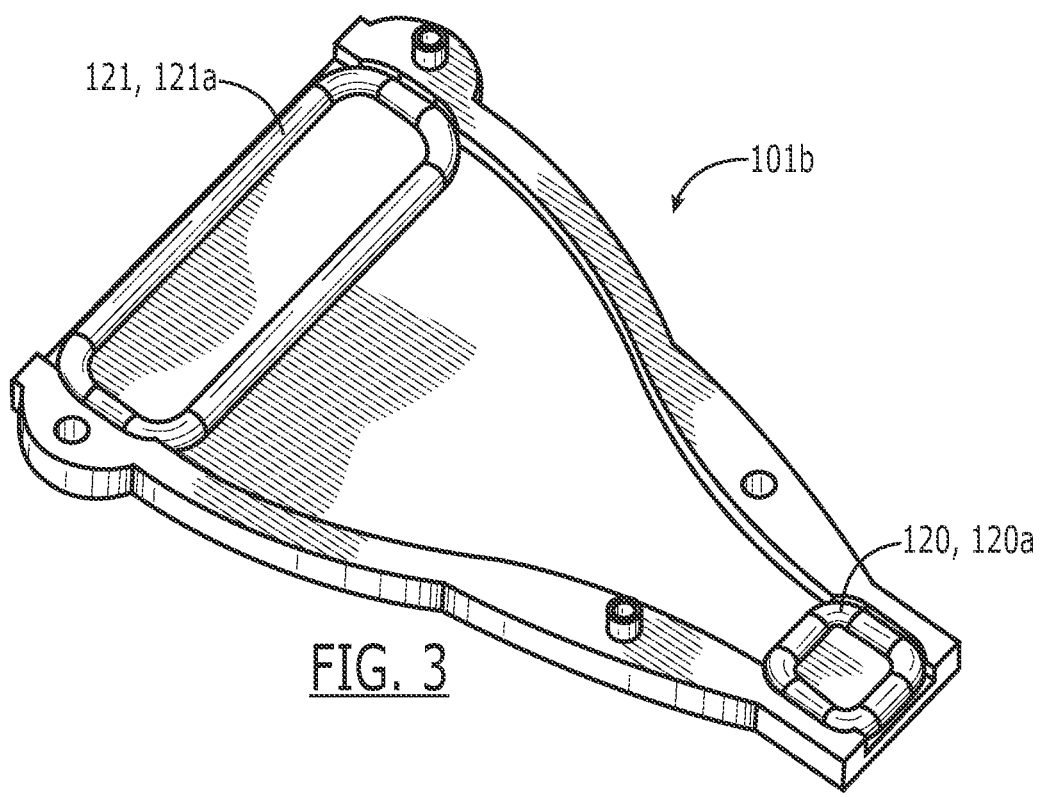
FIG. 3 shows resilient members disposed in the recesses of the housing component of FIG. 2.
Figure 7:
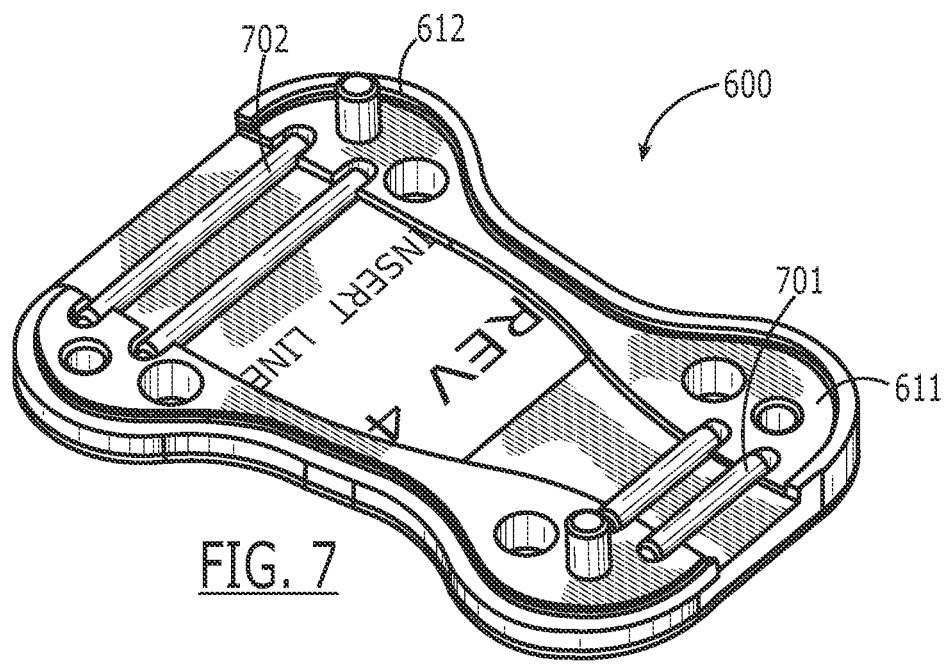
FIG. 7 shows the housing component of FIG. 6 with resilient members disposed therein.

The resilient material may be any material that is compliant and has a relative high coefficient of friction. The compliance is needed to deform around the fibers without damaging the fibers, while the high coefficient of friction is needed to grip the fibers and prevent them from moving axially and laterally within the channel. Suitable materials for the resilient member, include, for example, silicone, fluorosilicone, buna rubber, etc. The resilient material may be configured in different ways. For example, in one embodiment, the resilient material is in the form of a discrete resilient member, which may be any shape, for example, it may be a strip, cord, O-ring, or even a pad. In one embodiment, the resilient member is a commercially available O-ring. Aside from being commercially available, a single O-ring can be configured to traverse the channel 102 twice when configured in an oval pattern in the recesses 201, 202 as shown in FIGS. 2 and 3 and discussed below. In another embodiment, the resilient member comprises strips 701, 702 as shown in FIG. 7. In another embodiment, the resilient material is integral to the housing component. For example, in one embodiment, at least a portion of the channel 103 is overmolded with resilient material. This overmolding may be, for example, just one or more discrete strips in the channel, or entire areas of the housing. In yet another embodiment, the resilient material is applied to the fibers rather than the housing 101. With such an embodiment, the fibers may be fanned out and then overmolded to hold them in relative position to each other. The overmolded assembly then may be placed in the housing such that the housing serves to protect the overmolded assembly and provides means to attach or secure the fan-out device to a cabinet or other structure as mentioned above. Still other embodiments of incorporating the resilient material into the housing 101 will be obvious to one of skill in the art in light of this disclosure.

Figure 6:
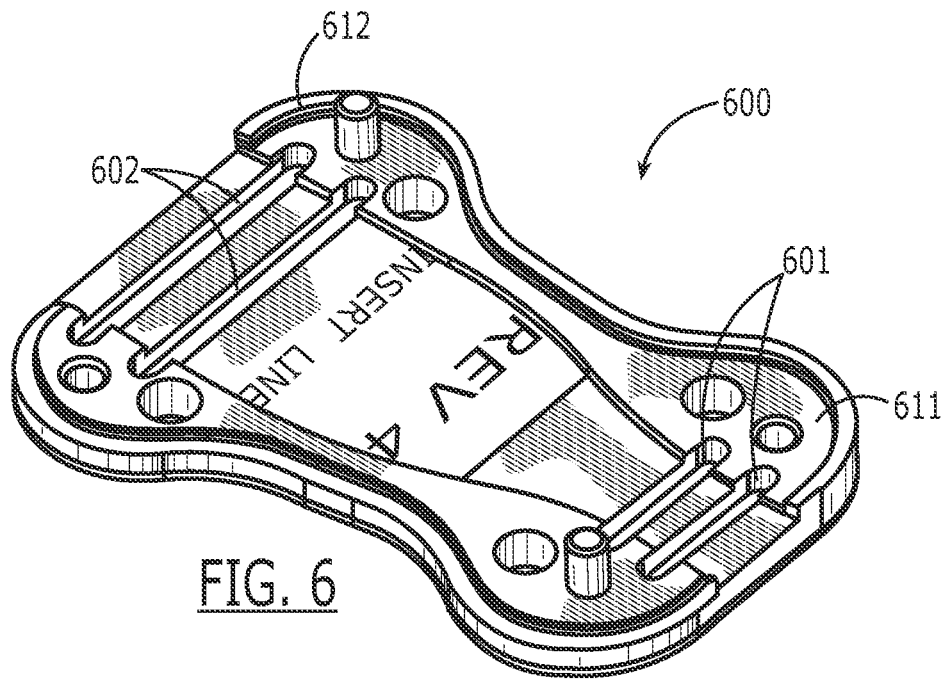
FIG. 6 shows a housing component of another embodiment of the fan-out device of the present invention.

In one embodiment, the first and second ends 111, 112 define recesses 201, 202 that traverse the channel 102 in which are disposed resilient material 120, 121 in the form of resilient members 120*a*, 121*a*, respectively. The recesses 201, 202 are configured to receive the resilient members. In one embodiment, the recess traverses the channel 102 to span from one side 103 to the other side 103 to ensure that all fibers within the channel contact the resilient member. In one embodiment, the recesses 201 and/or 202 are configured to guide the resilient member across the channel 102 multiple times. For example, in FIG. 2, each recess 201, 202 is configured to guide the resilient members 120*a*, 121*a* across the channel twice. This also accommodates an O-ring configuration of the resilient members 120*a*, 121*a*. In another embodiment, strips of resilient material 701, 702, are disposed in parallel recesses 601, 602 at the first and second ends 611, 612, respectively, in the housing component 600 as shown in FIG. 6. It should be understood that the recesses can have still other configurations to traverse the channel multiple times. For example, if the resilient member is a long cord, and not an O-ring, the recesses 201, 202 may serpentine across the channel. Likewise, if the resilient member is a pad, the recesses 201, 202 would be configured as a rectangle rather than a circuitous groove. Still other configuration will be oblivious to one of skill in the art in light of this disclosure.

Figure 4:
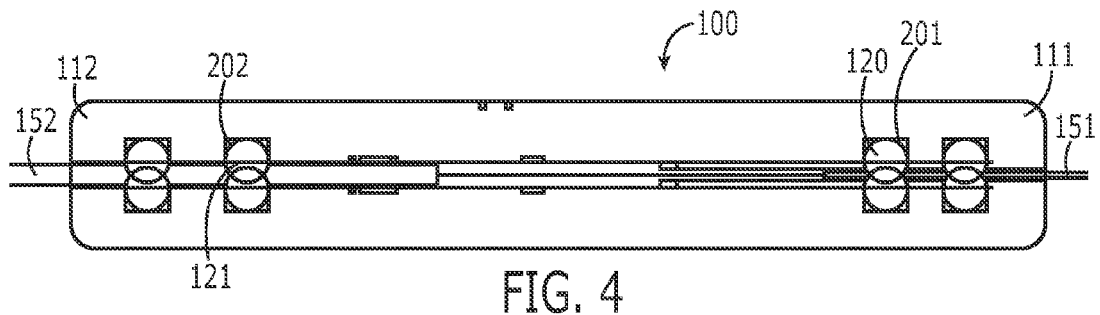

To ensure that the proper retaining force is applied to the fibers, in one embodiment, the thickness of the resilient members and recess depth within the housing component are coordinated. Specifically, referring to FIG. 4, a cross section of the housing 100 as shown in which the resilient members 120*a*, 121*a* disposed in the recesses 201, 202 of the housing components 101*a*, 101*b* are shown deforming around the fibers. As shown, the ribbon cable 151 is thinner than the buffer tube 152. To accommodate this difference in thickness, the resilient member 120*a* may be thicker than the resilient member 121*a*. Alternatively, the recess 202 may be deeper than the recess 201 as shown in FIG. 4. The size of the O-rings and the depth of the recess may be optimized by one skilled in the art in light of this disclosure to provide the desire retaining force on the fibers.

In one embodiment, the fan-out device 100 comprises engagement mechanism 130 on the housing components of the housing 101. The engagement mechanism may be any engagement known for connecting two components together, and include, for example, adhesive, pegs/peg holes, latches, snaps, tabs/recesses, hinge and latch, bore holes (e.g. threaded and non-threaded) to accommodate fasteners (e.g. bolts and screws), and grooves/ridges or similar contour to receive an external resilient member (e.g. spring or rubber band) to hold the two housing components together. In one embodiment, the engagement mechanism comprises peg and peg holes disposed on the sides 103 of the housing components.

In one embodiment, the first and second housing components 101*a*, 101*b* of the housing 101 are identical. In one particular embodiment, the first and second housing components are not only identical, but also are hermaphroditic, meaning each component is configured to inter-engage with the other to form a complete assembly. To render the first and second housing components hermaphroditic, each housing component has first and second engagement mechanisms. For example, referring to FIG. 1*b*, the one half 101*b* comprises a peg 130 and a peg hole 131. The peg and the peg hole are arranged such that when an identical housing component (e.g., housing component 101a) is mated with housing component 101b, the peg and peg holes align to inter-engage as shown in the FIG. 1a. Still other hermaphroditic engagement means will be known to one skilled in the art in light of this disclosure.

Figure 5:
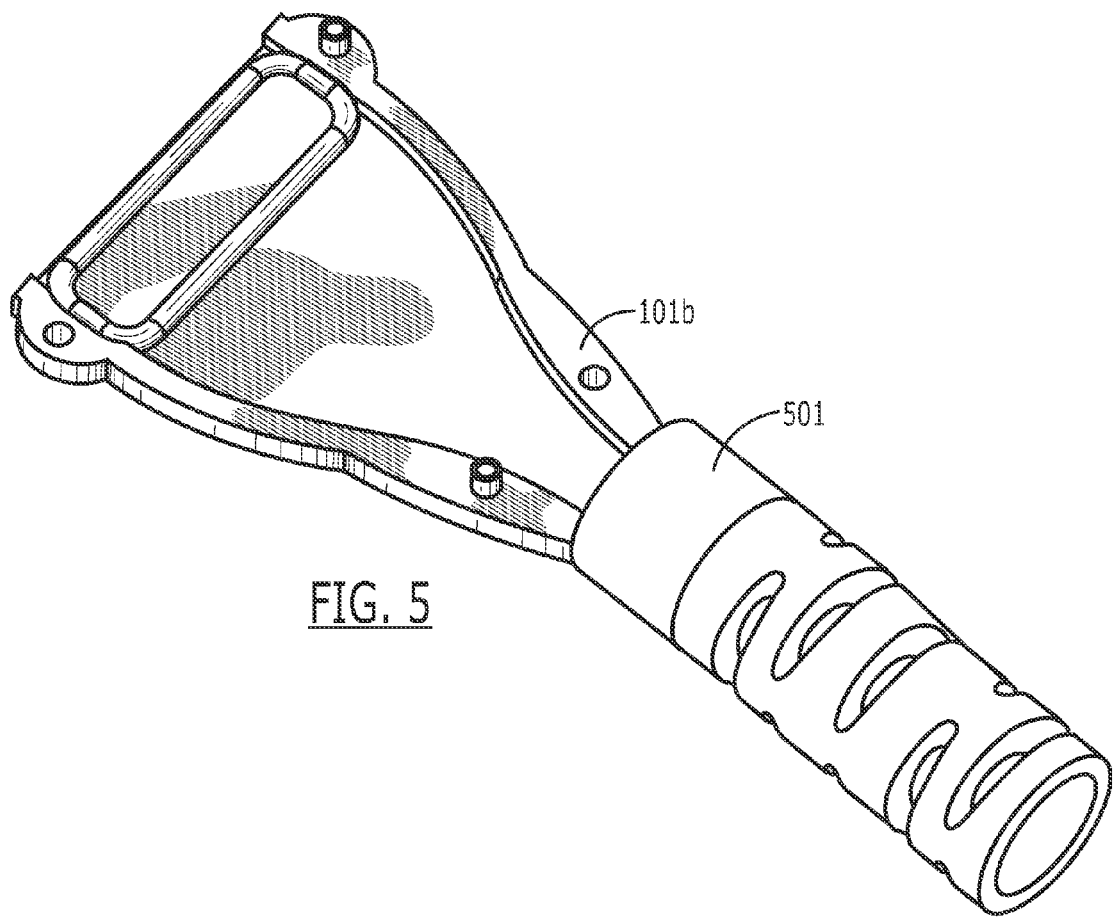
FIG. 5 shows a housing component with a strain relief.

Referring to FIG. 5, an embodiment is shown in which the housing component 101b comprises strain relief 501 at the first end 111 to prevent excessive bending of the ribbon cable. Strain relief is well known in the art. In one embodiment, the strain relief comprises hermaphroditic halves similar to the housing components 101a, 101b. This way, rather than having to slide the strain relief up the ribbon cable (which can be prohibitively difficult), the strain relief can be snapped over the ribbon cable at the same time the housing components 101a and 101b are inter-engaged. In another embodiment, the strain relief is a single component which is slid over the cable to the first end 111 of the housing components. In one particular embodiment, the strain relief is elastomeric such that it can be slid over the first end 111 of the housing components 101a, 101b and function not only as a strain relief, but also as the engagement mechanism to hold the first and second housing components 101a, 101b together.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A universal fan-out device comprising:
   a housing having first and second openings, said housing comprising first and second housing components, each of said first and second housing components having a first end and a second end, a channel running between said first and second ends, and sides along each side of said channel;
   a resilient material disposed in said channel to restrict movement of fibers within said channel, wherein said resilient material is in the form of one or more discrete resilient members disposed at least partially in said channel; and
   an engagement mechanism operatively connected to said housing to inter-engage said first and second housing components together.

2. The device of claim 1, wherein said first and second housing components define first and second recesses, respectively, in said channel, each recess configured to receive one of said resilient members.

3. The device of claim 2, wherein said first and second recesses traverse said channel from one side to the other side.

4. The device of claim 3, wherein said second recess is deeper than said first recess.

5. The device of claim 1, wherein said first and second recesses are oval to receive an O-ring.

6. The device of claim 5, wherein said resilient members are O-rings.

7. The device of claim 1, wherein said engagement mechanism is selected from the group consisting of pegs/peg holes, snaps, latches, tabs, bore holes for fasteners, hinge and latch, and adhesive.

8. The device of claim 7, wherein said engagement mechanism is disposed on the sides of said housing components.

9. The device of claim 8, wherein said first and second component comprise at least one peg and at least one peg hole configured to receive a peg in an interference fit.

10. The device of claim 1, wherein said second opening is larger than said first opening.

11. The device of claim 1, wherein said first and second housing components are identical.

12. The device of claim 11, wherein said first and second housing components are hermaphroditic.

13. The device of claim 1, further comprising a bundle of fibers disposed at said first end, and at least a portion of said fibers in one or more discrete buffer tubes disposed at said second end.

14. The device of claim 12, wherein each of said fibers is in a discrete buffer tube disposed at said second end.

15. The device of claim 1, further comprising a strain relief at said first end.

16. The device of claim 14, wherein said strain relief comprises first and second halves.

17. The device of claim 15, wherein said first an second halves are hermaphroditic.

18. The device of claim 14, wherein said engagement mechanism comprises a resilient strain relief that is disposed over said first ends of said first and second housing components to hold them together.

* * * * *